(12) United States Patent
Ewens et al.

(10) Patent No.: US 10,401,881 B2
(45) Date of Patent: Sep. 3, 2019

(54) SYSTEMS AND METHODS FOR QUANTIFICATION OF A GAS TURBINE INLET FILTER BLOCKAGE

(71) Applicant: General Electric Company, Schenectady, NY (US)

(72) Inventors: David Spencer Ewens, Greenville, SC (US); John Raffensperger, Greenville, SC (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 15/432,353

(22) Filed: Feb. 14, 2017

(65) Prior Publication Data

US 2018/0230907 A1 Aug. 16, 2018

(51) Int. Cl.
| | | |
|---|---|---|
| F01D 21/00 | (2006.01) | |
| F02C 3/04 | (2006.01) | |
| F02C 7/05 | (2006.01) | |
| G05D 7/06 | (2006.01) | |
| G01M 15/14 | (2006.01) | |
| G01F 9/00 | (2006.01) | |
| F02C 9/00 | (2006.01) | |

(52) U.S. Cl.
CPC ............. *G05D 7/0635* (2013.01); *F02C 7/05* (2013.01); *F02C 9/00* (2013.01); *G01F 9/001* (2013.01); *G01M 15/14* (2013.01); *F05D 2260/607* (2013.01); *F05D 2260/80* (2013.01)

(58) Field of Classification Search
CPC ...... F02C 9/00; F02C 9/22; F02C 9/48; F02C 9/28; F02C 7/05; F05D 2260/964; F05D 2260/80; F05D 2260/607; G05B 15/02; F23N 2031/06; F23N 2041/20; F23N 5/003; F23N 5/242; Y02T 50/677; G01F 9/001; G01M 15/14; G05D 7/0635
See application file for complete search history.

(56) References Cited

U.S. PATENT DOCUMENTS 8,720,258 B2 *  5/2014  Meisner ................ G01M 15/14
                                                73/112.01
9,803,560 B2 * 10/2017  Stuttaford .............. G05B 15/02
(Continued)

*Primary Examiner* — Abdelmoniem I Elamin
(74) *Attorney, Agent, or Firm* — Eversheds Sutherland (US) LLP

(57) ABSTRACT

Embodiments of the disclosure can relate to quantification of gas turbine inlet filter blockage. In one embodiment, a method can include receiving data associated with an inlet flow conditioning system associated with a turbine in a power plant. The method may further include determining an inlet flow associated with the turbine, based at least in part on operational data from the turbine. The method may further include determining an effective area of the inlet flow conditioning system, based at least in part on the inlet flow associated with the turbine. The method can further include determining a fouling rate of the inlet flow conditioning system, based at least in part on a difference between the effective area of the inlet flow conditioning system and a corresponding effective area of the inlet flow conditioning system determined at a prior operation. The method may further include identifying a corrective recommendation for the inlet flow conditioning system, based at least in part on the fouling rate and a performance target of the turbine.

20 Claims, 5 Drawing Sheets

(56) References Cited

U.S. PATENT DOCUMENTS

| | | | | |
|---|---|---|---|---|
| 2003/0045992 A1* | 3/2003 | Humerickhouse | ........ | F02C 9/00 |
| | | | | 701/100 |
| 2007/0044656 A1* | 3/2007 | Farmer | .................... | F02C 7/05 |
| | | | | 95/1 |
| 2008/0228338 A1* | 9/2008 | Howard | ............. | G05B 23/0254 |
| | | | | 701/31.4 |
| 2010/0089067 A1* | 4/2010 | Wilkes | ............... | G05B 23/0254 |
| | | | | 60/773 |
| 2013/0255359 A1* | 10/2013 | Smith | ........................ | F02C 7/05 |
| | | | | 73/38 |
| 2014/0250904 A1* | 9/2014 | Lebel | ....................... | F02C 6/003 |
| | | | | 60/774 |
| 2014/0277789 A1* | 9/2014 | Stuttaford | ............... | G05B 15/02 |
| | | | | 700/287 |
| 2015/0025814 A1* | 1/2015 | Giannini | ............ | G05B 23/0216 |
| | | | | 702/35 |
| 2015/0027212 A1* | 1/2015 | Fadlun | ............... | G05B 23/0216 |
| | | | | 73/112.05 |
| 2015/0114221 A1* | 4/2015 | Ekanayake | ............ | B01D 46/46 |
| | | | | 95/1 |
| 2015/0345390 A1* | 12/2015 | Ekanayake | ............. | F02C 7/047 |
| | | | | 60/779 |
| 2016/0273767 A1* | 9/2016 | Unni | ....................... | F23N 5/242 |
| 2017/0320004 A1* | 11/2017 | Allegorico | ......... | B01D 46/0086 |
| 2017/0356349 A1* | 12/2017 | Jiang | ........................ | F02C 9/46 |
| 2018/0196894 A1* | 7/2018 | Venedikis | ........... | G06F 17/5009 |

* cited by examiner

SYSTEMS AND METHODS FOR QUANTIFICATION OF A GAS TURBINE INLET FILTER BLOCKAGE

TECHNICAL FIELD

Embodiments of this disclosure generally relate to power plants, and more specifically, to systems and methods for quantification of a gas turbine inlet filter blockage.

BACKGROUND

A power plant can include one or more turbines, such as, for example, a gas turbine and/or a steam turbine. The power plant may further include one or more inlet flow conditioning systems to condition flow entering the gas turbine. For example, an inlet air filter assembly may condition and direct flow of air to the gas turbine. Blockage of the inlet air filter assembly may lead to extensive loss of operational revenue.

BRIEF DESCRIPTION OF THE DISCLOSURE

Some or all of the above needs and/or problems may be addressed by certain embodiments of the disclosure. Certain embodiments may include systems and methods for quantification of a gas turbine inlet filter blockage. Certain embodiments of the disclosure can provide systems and methods to predict inlet flow conditioning system performance in power plants. According to one embodiment of the disclosure, a method can be provided. The method may include receiving data associated with an inlet flow conditioning system associated with a turbine in a power plant. The method may further include determining an inlet flow associated with the turbine, based at least in part on operational data from the turbine. The method may further include determining an effective area of the inlet flow conditioning system, based at least in part on the inlet flow associated with the turbine. The method can further include determining a fouling rate of the inlet flow conditioning system, based at least in part on a difference between the effective area of the inlet flow conditioning system and a corresponding effective area of the inlet flow conditioning system determined at a prior operation. The method may further include identifying a corrective recommendation for the inlet flow conditioning system, based at least in part on the fouling rate and a performance target of the turbine.

According to another embodiment of the disclosure, a system can be provided. The system may include a controller. The system can also include a memory with instructions executable by a computer for performing operations that can include: receiving data associated with an inlet flow conditioning system associated with a turbine in a power plant, based at least in part on operational data from the turbine, determining an inlet flow associated with the turbine. The operations may further include determining an effective area of the inlet flow conditioning system, based at least in part on the inlet flow associated with the turbine. The operations can further include determining a fouling rate of the inlet flow conditioning system, based at least in part on a difference between the effective area of the inlet flow conditioning system and a corresponding effective area of the inlet flow conditioning system determined at a prior operation. The operations may further include identifying a corrective recommendation for the inlet flow conditioning system, based at least in part on the fouling rate and a performance target of the turbine.

According to another embodiment of the disclosure, a system can be provided. The system may include a turbine associated with a power plant. The system may further include a controller in communication with the power plant and the turbine. The system can also include a memory with instructions executable by a computer for performing operations that can include: receiving data associated with an inlet flow conditioning system associated with a turbine in a power plant; based at least in part on operational data from the turbine, determining an inlet flow associated with the turbine; based at least in part on the inlet flow associated with the turbine, determining an effective area of the inlet flow conditioning system; based at least in part on a difference between the effective area of the inlet flow conditioning system and a corresponding effective area of the inlet flow conditioning system determined at a prior operation, determining a fouling rate of the inlet flow conditioning system; and based at least in part on the fouling rate and a performance target of the turbine, identifying a corrective recommendation for the inlet flow conditioning system.

Other embodiments, features, and aspects of the disclosure will become apparent from the following description taken in conjunction with the following drawings.

BRIEF DESCRIPTION OF THE DRAWINGS

Figure 1:
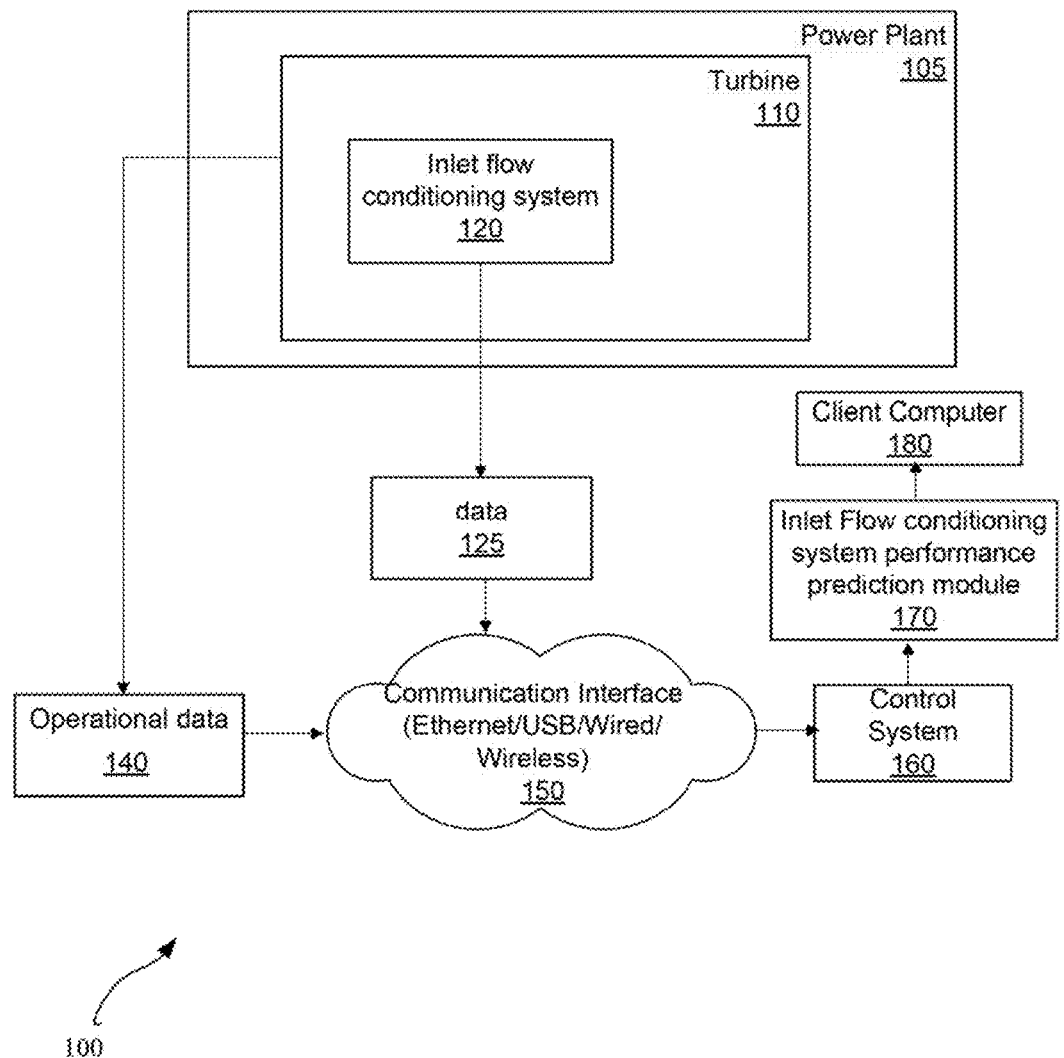

Having thus described the disclosure in general terms, reference will now be made to the accompanying drawings, which are not necessarily drawn to scale, and wherein:

FIG. 1 illustrates an example system environment in accordance with certain embodiments of the disclosure.

Figure 2:
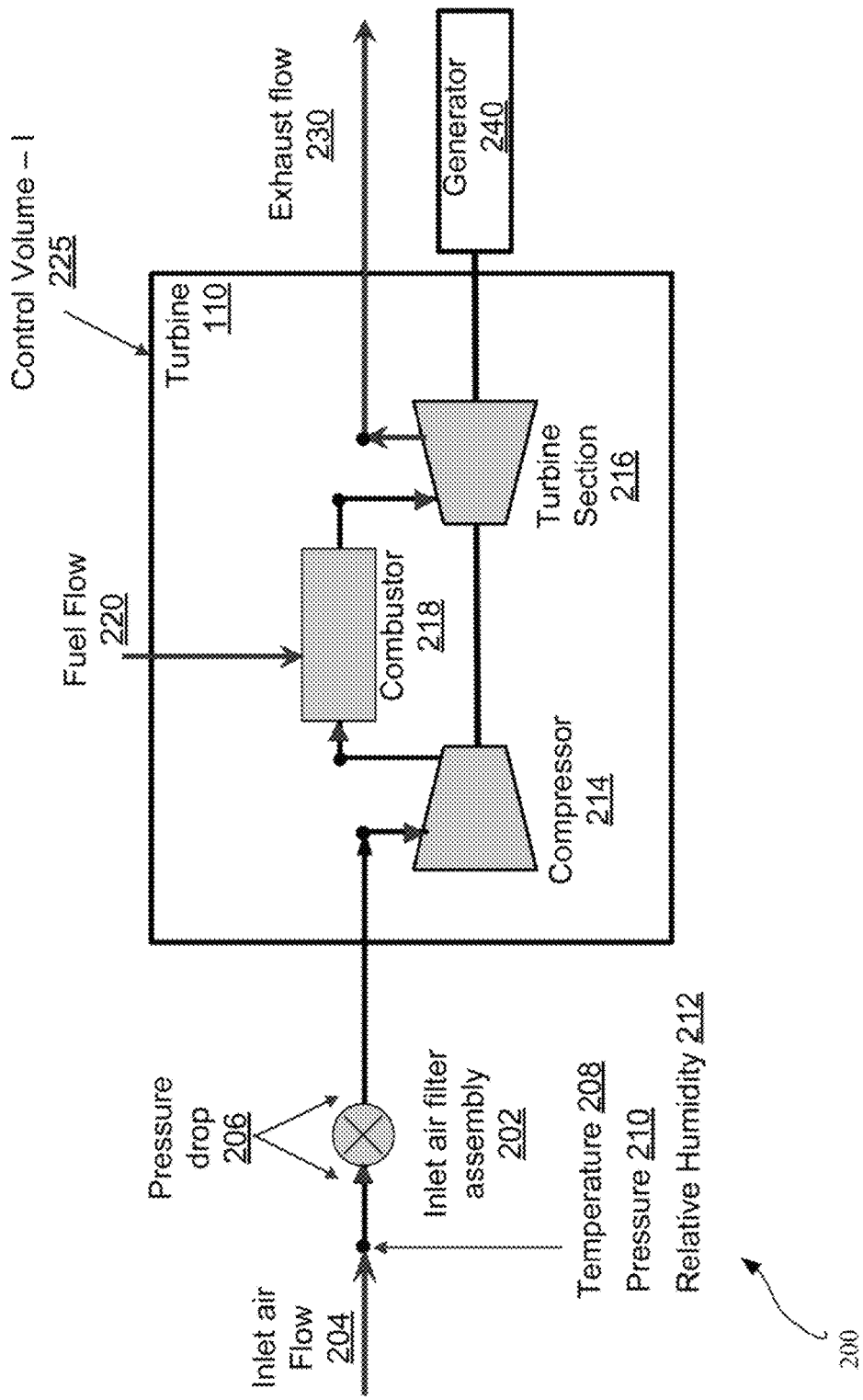

FIG. 2 illustrates an example control volume around a turbine excluding the inlet flow conditioning system in accordance with certain embodiments of the disclosure.

Figure 3:
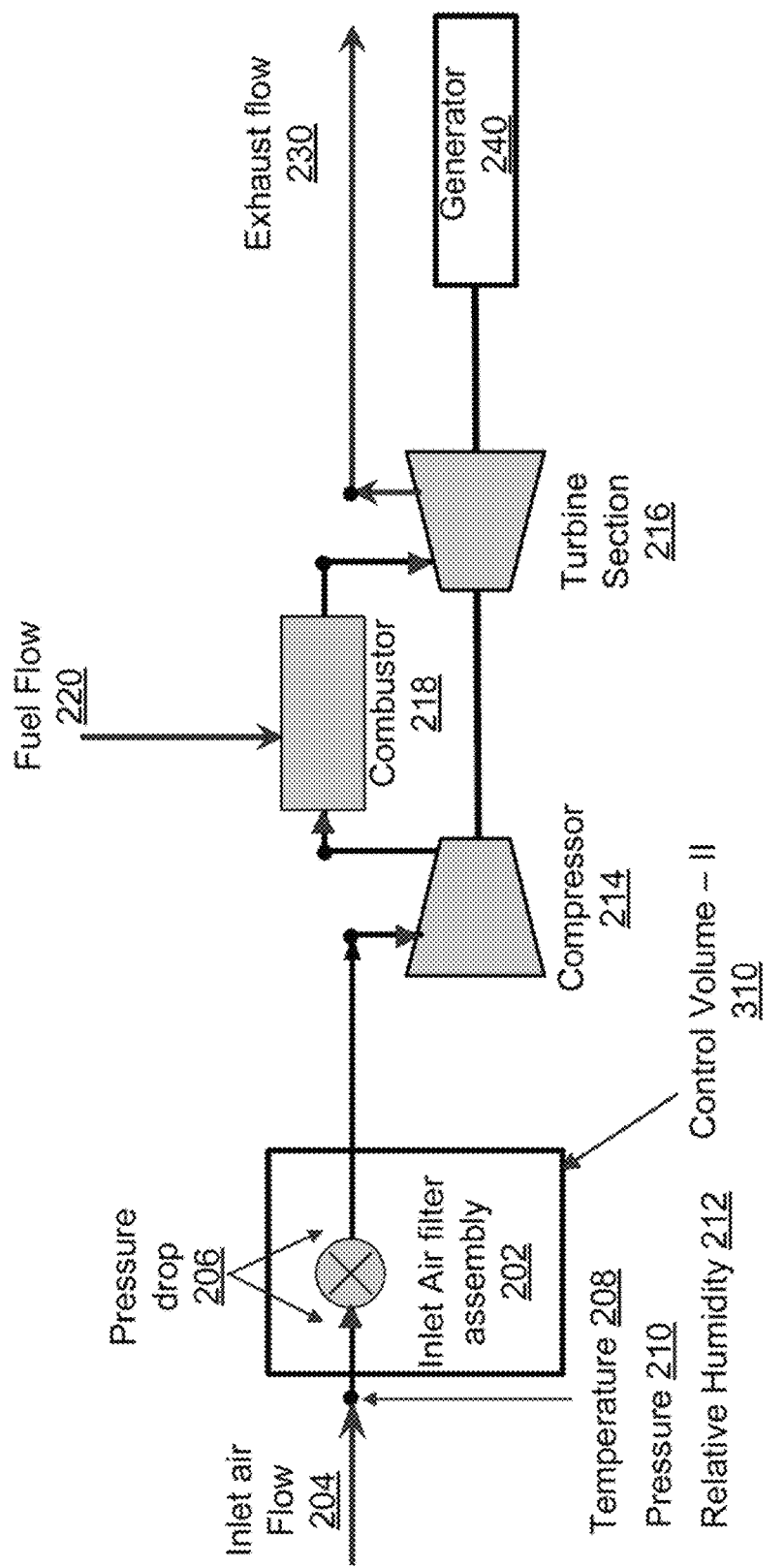

FIG. 3 illustrates an example control volume around an inlet flow conditioning system excluding the turbine in accordance with certain embodiments of the disclosure.

Figure 4:
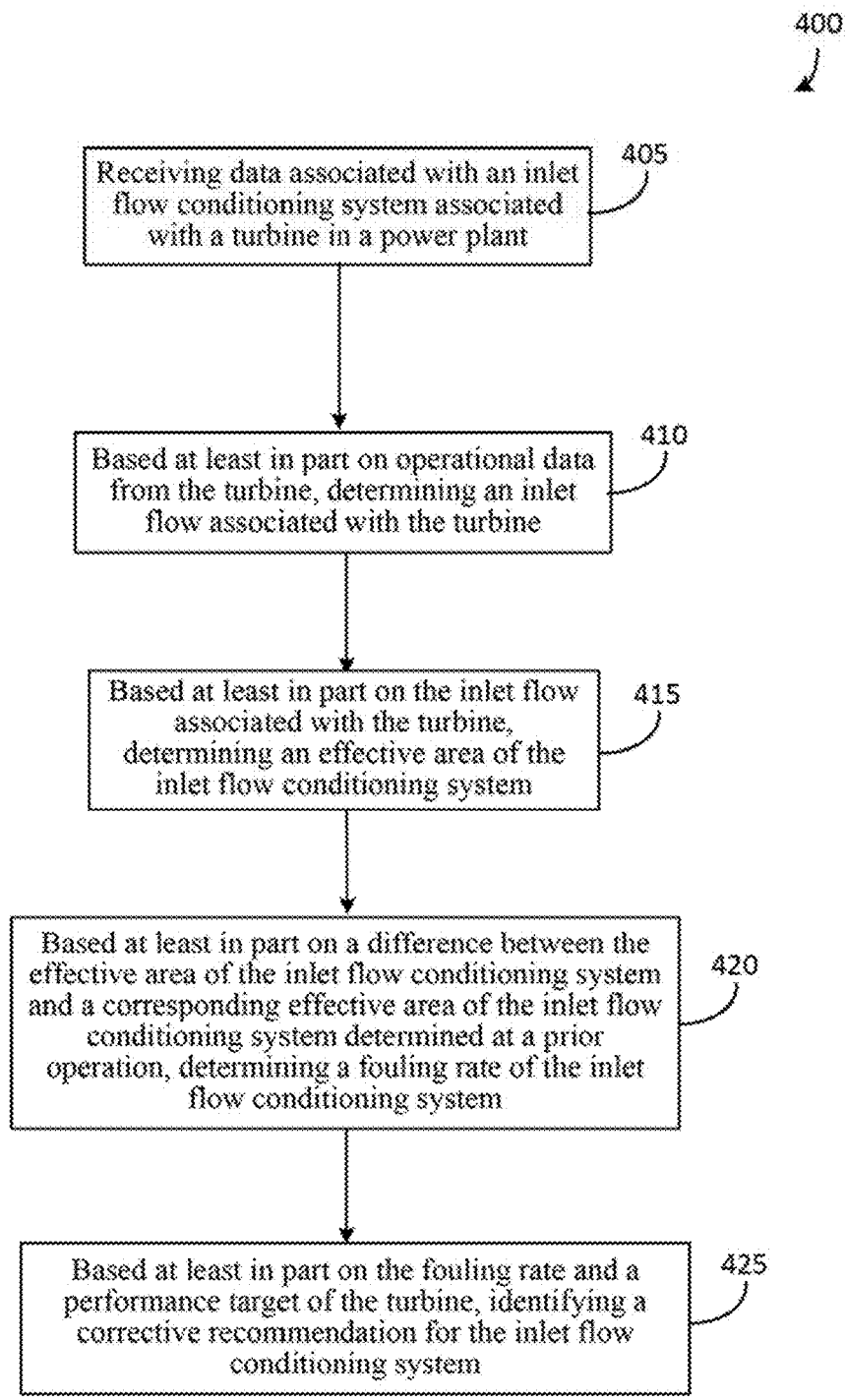

FIG. 4 illustrates an example flowchart of a method in accordance with certain embodiments of the disclosure.

Figure 5:
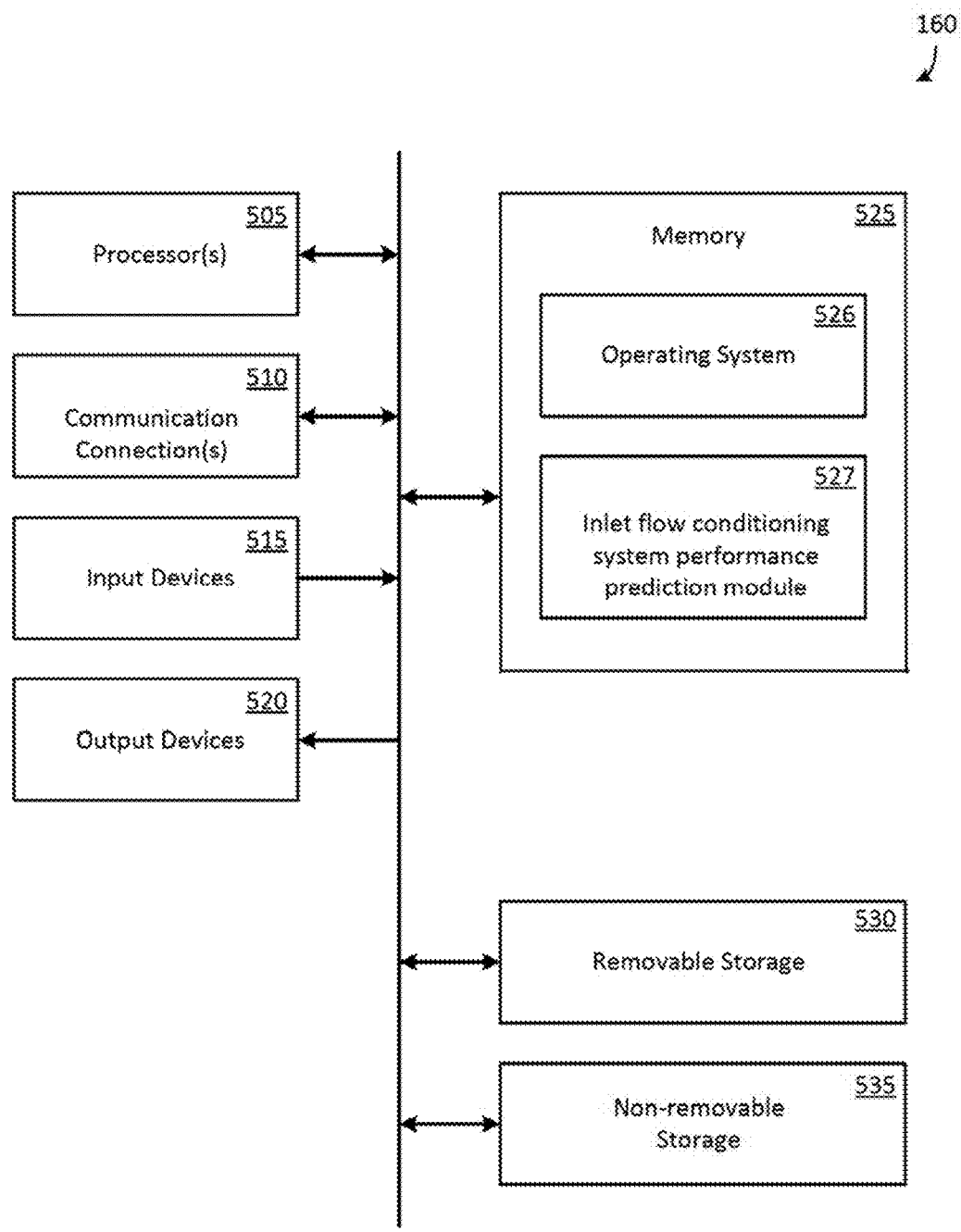

FIG. 5 illustrates an example control system in accordance with certain embodiments of the disclosure.

DETAILED DESCRIPTION

The disclosure now will be described more fully hereinafter with reference to the accompanying drawings, in which example embodiments of the disclosure are shown. This disclosure may, however, be embodied in many different forms and should not be construed as limited to the example embodiments set forth herein; rather, these example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents. Like numbers refer to like elements throughout.

Certain embodiments described herein relate to systems and methods for quantification of a gas turbine inlet filter blockage. Certain embodiments of the disclosure can also provide systems and methods to predict inlet flow conditioning system performance in power plants. For example, as will be described in greater detail herein, data associated with an inlet flow conditioning system associated with a turbine in a power plant may be received; based at least in part on operational data from the turbine, an inlet flow associated with the turbine may be determined; based at least in part on the inlet flow associated with the turbine, an effective area of the inlet flow conditioning system may be determined; based at least in part on a difference between the effective area of the inlet flow conditioning system and a corresponding effective area of the inlet flow conditioning system determined at a prior operation, a fouling rate of the inlet flow conditioning system may be determined; based at least in part on the fouling rate and a performance target of the turbine, a corrective recommendation for the inlet flow conditioning system may be identified.

One or more technical effects associated with certain embodiments herein may include, but are not limited to, predicting inlet flow conditioning system performance in power plants. Determination of rate of changes associated with the effective area of the inlet flow conditioning system and determination of corresponding fouling rates can enable one to proactively plan outages and operational modifications to repair, replace or clean the inlet flow conditioning system and avoid potentially high operational revenue loss. Certain embodiments herein may also have a technical effect of estimating degradation associated with the inlet flow conditioning system. Certain embodiments may also have a technical effect of estimating pressure drop or other parameters associated with operation of the turbine or the power plant, based on predicting inlet flow conditioning system effective area. The following provides a detailed description of various example embodiments of the disclosure.

FIG. 1 depicts an example system 100, such as the inlet flow conditioning system 120 associated with a turbine 110, in a power plant 105. According to an example embodiment of the disclosure, the power plant 105 may include one or more turbines, such as a turbine 110 of FIG. 1, that can produce power, an inlet flow conditioning system 120 that can condition flow to the turbine 110, and one or more controllers, such as the control system 160, that can control the power plant 105 and/or the turbine 110. The term "controller" and "control system" may be used interchangeably throughout the disclosure. The system environment 100, according to an embodiment of the disclosure, can further include data 125 that may include data from sensors associated with the inlet flow conditioning system 120, operational data from the turbine 140, a communication interface 150, a control system 160, an inlet flow conditioning system performance prediction module 170, and a client computer 180.

Referring again to FIG. 1, the inlet flow conditioning system 120 of FIG. 1 may be associated with operation of a turbine 110, such as a gas turbine. In an example embodiment of the disclosure, the inlet flow conditioning system 120 may include an inlet filter assembly that conditions inlet air to the gas turbine. In another example embodiment of the disclosure, the inlet flow conditioning system 120 may include a fuel nozzle with a filter that conditions and admits fuel to the turbine 110.

According to an example embodiment of the disclosure, data 125 may include information received from sensors associated with the inlet flow conditioning system. Data 125 may include, for example, a pressure drop across the inlet flow conditioning system, a temperature signal, such as, for example, a temperature of air entering the inlet filter assembly or a pressure signal associated with the inlet flow conditioning system, such as, for example, barometric pressure of air entering the inlet filter assembly or static pressure of air downstream of the inlet filter assembly. In certain embodiments of the disclosure, data 125 may also include input from sensors associated with a relative humidity of fluid entering the inlet flow conditioning system, such as, for example, an ambient relative humidity of air entering the inlet filter assembly.

In an example embodiment of the disclosure, operational data 140 may include data representing operational parameters of the turbine 110, including, for example, temperatures, pressures, flows in and out of the turbine 110, turbine power, valve positions, various control parameters controlling the turbine, and so on. In another example embodiment of the disclosure, operational data 140 may include data representing power plant 105 operational parameters. In an example embodiment of the disclosure, operational data 140 may include data from inlet flow conditioning systems that have configuration similar to the inlet flow conditioning system 120 of FIG. 1. Operational data 140 may include data representing inlet flow conditioning system 120 operation at a current time or from a prior operating time, such as, for example, operation from 1 day prior to current time, 1 week prior to current time, operation from 2 weeks prior to current time, operation from 4 weeks prior to current time, and so on.

The control system 160 can be communicatively coupled to receive data 125 and operational data 140 via a communication interface 150, which can be any of one or more communication networks such as, for example, an Ethernet interface, a Universal Serial Bus (USB) interface, or a wireless interface. In certain embodiments, the control system 160 can be coupled to data 125 and operational data 140 by way of a hard wire or cable, such as, for example, an interface cable.

The control system 160 can include a computer system having one or more processors that can execute computer-executable instructions to receive and analyze data from various data sources, such as data 125 and operational data 140, and can include an inlet flow conditioning system performance prediction module 170. The control system 160 can further provide inputs, gather transfer function outputs, and transmit instructions from any number of operators and/or personnel. The control system 160 can perform control actions as well as provide inputs to the inlet flow conditioning system performance prediction module 170. In some other embodiments, the control system 160 may determine control actions to be performed based on data received from one or more data sources, for example, from data 125 or operational data 140. In other instances, the control system 160 can be an independent entity communicatively coupled to the inlet flow conditioning system performance prediction module 170.

In one embodiment of the disclosure, the controller 160 can include a memory that can contain computer-executable instructions capable of receiving data associated with an inlet flow conditioning system 120 associated with the turbine 110. The data received from the inlet flow conditioning system 120 may be represented by data 125 of FIG. 1. Based at least in part on operational data 140 from the turbine 110, an inlet flow associated with the turbine may be determined. As will be described in more detail later, determination of the inlet flow associated with the turbine 110 may involve using one or more models associated with a control volume around the turbine 110 and excluding the inlet flow conditioning system 120. In an example embodiment of the disclosure, the one or more models associated with the turbine 110 may include, for example, a physics-based model that may simulate the operation of the gas turbine using operational data 140 in addition to using equations to calculate operational parameters. In another example embodiment, the one or more models associated with the turbine 110 may include, for example, an empirically tuned model that may utilize a model tuned based on prior operational parameters associated with turbines with configuration similar to turbine 110. In another example embodiment, the one or more models associated with the turbine 110 may also use a non-physics based model. Alternately, the one or more models associated with the turbine 110 may also use a model associated with determining an exhaust flow of the turbine 110. Exhaust flow of the turbine 110 may be determined using a second set of models associated with a second control volume around the turbine. The second set of models may also use a physics-based model, a non-physics based model, an empirically tuned model, and so on. In an example embodiment of the disclosure, based at least in part on the exhaust flow, the inlet flow associated with the turbine 110 may be determined.

According to an example embodiment of the disclosure, the computer-executable instructions may further be capable of determining an effective area of the inlet flow conditioning system 120, based at least in part on the inlet flow associated with the turbine 110. This may be done by establishing a different control volume around the inlet flow conditioning system 120. Furthermore, a difference between the effective area of the inlet flow conditioning system 120 and a corresponding effective area of the inlet flow conditioning system determined at a prior operation may be determined. In an example embodiment, the prior operation may include operation that may have occurred 1 day, 1 week, 2 weeks, 1 month and so on prior to current time. Based at least in part on the difference between the effective area of the inlet flow conditioning system 120 and the corresponding effective area of the inlet flow conditioning system determined at the prior operation, a fouling rate of the inlet flow conditioning system 120 may be determined. In an example embodiment, data associated with the effective area of the inlet flow conditioning system 120 may be tracked over several day or weeks at a time. A rate of change in the effective area of the inlet flow conditioning system 120 may then be determined. This may indicate the fouling rate of the inlet flow conditioning system 120. The computer-executable instructions may further be capable of identifying a corrective recommendation for the inlet flow conditioning system 120, based at least in part on the fouling rate and a performance target of the turbine 110. The performance target of the turbine may be determined, for example, by power plant operators based on market conditions, grid requirements, revenue model of the power plant 105, and so on. The corrective recommendation for the inlet flow conditioning system 120 may include, for example, replacing the entire inlet flow conditioning system 120, cleaning the inlet flow conditioning system 120, replacing parts of the inlet flow conditioning system 120, and so on.

Referring again to FIG. 1, the memory associated with the controller 160 can further contain computer-executable instructions capable of determining an inlet flow conditioning system pressure drop at an operating condition of the turbine 110, based at least in part on the effective area of the inlet flow conditioning system 120. Furthermore, the inlet flow conditioning system pressure drop at the operating condition may be compared to a threshold inlet flow conditioning system pressure drop. The threshold inlet flow conditioning system pressure drop may be, for example, a predetermined value based on empirical models, based on operator experience, based on the revenue model associated with the power plant 105, and so on. The computer-executable instructions may further generate an alert, if the inlet flow conditioning system pressure drop at the operating condition exceeds the threshold inlet flow conditioning system pressure drop.

The alert may be outputted via a client device, for example, the client computer 180 as indicated in FIG. 1. Another corrective recommendation for the inlet flow conditioning system can then be identified. For example, for an inlet filter assembly conditioning air to a gas turbine, if the pressure drop during operation exceeds a threshold level, an alert can be generated and an inspection, repair or replacement recommendation for the inlet filter assembly can be identified. Furthermore, the identified corrective recommendation for the inlet flow conditioning system 120 can be performed by or otherwise implemented by the control system 160.

Increased pressure drop during operation above threshold levels may indicate blockage or loading of a gas turbine inlet air filter assembly. Corrective recommendations may include replacing the inlet air filter assembly, cleaning the inlet air filter assembly using offline or online water washing procedures, and so on.

Referring again to FIG. 1, the control system 160 or the inlet flow conditioning system performance prediction module can also include software and/or hardware to determine the fouling rate and corrective recommendation associated with operation of the inlet flow conditioning system 120. This may include, for example, executing a model to evaluate revenue impact of the fouling rate of the inlet flow conditioning system 120. The model may incorporate dynamic parameters associated with the power plant 105, for example, such as, Megawatts (MW) produced, pressures, temperatures, fuel consumption rates, market price for fuel, market price for electricity, cost to perform maintenance action, and so on. The model can include an architecture that can utilize data 125 and operational data 140 to evaluate revenue impact of the fouling associated with the operation of the inlet flow conditioning system 120.

Other embodiments and examples of the disclosure in FIG. 1 will be apparent to one skilled in the art.

FIG. 2 depicts an example control volume around the turbine 110 excluding the inlet flow conditioning system 120 in accordance with certain embodiments of the disclosure. FIG. 2 shows an inlet flow conditioning system 120 that includes an inlet filter assembly of a turbine 110. The turbine 110 can also include a compressor 214 which receives conditioned inlet air 204 from the inlet air filter assembly 202. In an example embodiment, the inlet air filter assembly may further include sensors measuring temperature 208, pressure 210, pressure drop 206, and relative humidity 212. The turbine 110 may further include a combustor 218 that may mix and burn fuel flow 220 with the conditioned and pressurized inlet air flow 204 to produce exhaust flow 230, that may be expanded via a turbine section 216 to produce power at a generator 240. In an example embodiment of the disclosure, Control Volume-I may represent boundaries associated with the one or more models that may determine the inlet flow of the turbine 110. As indicated in FIG. 2, Control Volume-I may exclude the inlet air filter assembly 202. By excluding the inlet air filter assembly 202 from the Control Volume-I 225, the inlet air flow may be independently determined based on the one or more models based on the Control Volume-I 225 around the turbine 110.

Other embodiments and examples of the disclosure in FIG. 2 will be apparent to one skilled in the art.

FIG. 3 depicts an example control volume around an inlet flow conditioning system excluding the turbine 110 in accordance with certain embodiments of the disclosure. The system of FIG. 3 is similar to that of FIG. 2, except for the change in the control volume designation. A new control volume, namely Control Volume-II 310 may be captured around the inlet air filter assembly 120. Based on the determined inlet flow of the turbine 110, the Control Volume-II 310 may be used to determine the effective area of the inlet air filter assembly 120.

Other embodiments and examples of the disclosure in FIG. 3 will be apparent to one skilled in the art.

Referring now to FIG. 4, a flow diagram of an example method 400 is shown, according to an example embodiment of the disclosure. The method 400 may be utilized in association with various systems, such as the system 100 illustrated in FIG. 1, the example sub-systems illustrated in FIG. 2 and FIG. 3, and/or the control system 160 illustrated in FIG. 5.

The method 400 may begin at block 405. At block 405, data associated with an inlet flow conditioning system 120 associated with a turbine 110 in a power plant 105 may be received. The data associated with the inlet flow conditioning system 120 may be input to data 125. Next, at block 410, the method 400 may include determining an inlet flow associated with the turbine 110, based at least in part on operational data 140 from the turbine 110. At block 415, the method 400 may further include determining an effective area of the inlet flow conditioning system 120, based at least in part on the inlet flow associated with the turbine 110. Next at block 420, the method 400 may further include determining a fouling rate of the inlet flow conditioning system 120, based at least in part on a difference between the effective area of the inlet flow conditioning system 120 and a corresponding effective area of the inlet flow conditioning system 120 determined at a prior operation. At block 425, the method 400 can include identifying a corrective recommendation for the inlet flow condition system 120, based at least in part on the fouling rate and a performance target of the turbine 110.

Other embodiments and examples of the disclosure in FIG. 4 will be apparent to one skilled in the art.

Attention is now drawn to FIG. 5, which illustrates an example controller 160 configured for implementing certain systems and methods in accordance with certain embodiments of the disclosure. The controller can include a processor 505 for executing certain operational aspects associated with implementing, for example, certain embodiments of systems and methods to predict inlet flow conditioning system performance in power plants. The processor 505 can be capable of communicating with a memory 525. The processor 505 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 525 and executed by the processor 505.

The memory 525 can be used to store program instructions that are loadable and executable by the processor 505 as well as to store data generated during the execution of these programs. Depending on the configuration and type of the controller 160, the memory 525 can be volatile (such as random access memory (RAM)) and/or non-volatile (such as read-only memory (ROM), flash memory, etc.). In some embodiments, the memory devices can also include additional removable storage 530 and/or non-removable storage 535 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 525 can include multiple different types of memory, such as static random access memory (SRAM), dynamic random access memory (DRAM), or ROM.

The memory 525, the removable storage 530, and the non-removable storage 535 are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Controller 160 can also include one or more communication connections 510 that can allow a control device (not shown) to communicate with devices or equipment capable of communicating with the controller 160. The controller can also include a computer system (not shown). Connections can also be established via various data communication channels or ports, such as USB or COM ports to receive cables connecting the controller 160 to various other devices on a network. In one embodiment, the controller 160 can include Ethernet drivers that enable the controller 160 to communicate with other devices on the network. According to various embodiments, communication connections 510 can be established via a wired and/or wireless connection on the network.

The controller 160 can also include one or more input devices 515, such as a keyboard, mouse, pen, voice input device, gesture input device, and/or touch input device. It can further include one or more output devices 520, such as a display, printer, and/or speakers.

In other embodiments, however, computer-readable communication media can include computer-readable instructions, program modules, or other data transmitted within a data signal, such as a carrier wave, or other transmission. As used herein, however, computer-readable storage media do not include computer-readable communication media.

Turning to the contents of the memory 525, the memory 525 can include, but is not limited to, an operating system (OS) 526 and one or more application programs or services for implementing the features and aspects disclosed herein. Such applications or services can include an inlet flow conditioning system performance prediction module 170 for executing certain systems and methods to predict inlet flow conditioning system performance in power plants. The inlet flow conditioning system performance prediction module 170 can reside in the memory 525 or can be independent of the controller 160, as represented in FIG. 1. In one embodiment, the inlet flow conditioning system performance prediction module 170 can be implemented by software that can be provided in configurable control block language and can be stored in non-volatile memory. When executed by the processor 505, the inlet flow conditioning system performance prediction module 170 can implement the various functionalities and features associated with the controller 160 described in this disclosure.

As desired, embodiments of the disclosure may include a controller 160 with more or fewer components than are illustrated in FIG. 5. Additionally, certain components of the controller 160 of FIG. 5 may be combined in various embodiments of the disclosure. The controller 160 of FIG. 5 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method comprising:
    receiving, from one or more sensors, data associated with an inlet flow conditioning system associated with a turbine in a power plant;
    based at least in part on operational data from the turbine, determining, via at least one processor, an inlet flow associated with the turbine;
    based at least in part on the inlet flow associated with the turbine, determining, via the at least one processor, an effective area of the inlet flow conditioning system;
    based at least in part on a difference between the effective area of the inlet flow conditioning system and a corresponding effective area of the inlet flow conditioning system determined at a prior operation, determining, via the at least one processor, a fouling rate of the inlet flow conditioning system; and
    based at least in part on the fouling rate and a performance target of the turbine, identifying and performing a corrective recommendation for the inlet flow conditioning system, wherein the corrective recommendation comprises at least one of the following: replacing an inlet air filter assembly, cleaning an inlet air filter assembly, or initiating replacement or cleaning of an inlet air filter assembly.

2. The method of claim 1, further comprising:
    based at least in part on the effective area of the inlet flow conditioning system, determining an inlet flow conditioning system pressure drop at an operating condition of the turbine;
    comparing the inlet flow conditioning system pressure drop at the operating condition to a threshold inlet flow conditioning system pressure drop;
    if the inlet flow conditioning system pressure drop at the operating condition exceeds the threshold inlet flow pressure drop, generating an alert; and
    based at least in part on the alert, identifying a corrective recommendation for the inlet flow conditioning system.

3. The method of claim 1, wherein identifying a corrective recommendation for the inlet flow conditioning system comprises: using a model to evaluate revenue impact of the fouling rate, wherein the model incorporates dynamic parameters associated with the power plant.

4. The method of claim 1, wherein determining an inlet flow associated with the turbine comprises:
    using one or more models associated with a control volume around the turbine excluding the inlet flow conditioning system.

5. The method of claim 1, wherein the data associated with the inlet flow conditioning system comprises: a pressure drop signal associated with the inlet flow conditioning system, a temperature signal associated with the inlet flow conditioning system, a pressure signal associated with the inlet flow conditioning system, or a relative humidity associated with the inlet flow conditioning system.

6. The method of claim 1, wherein determining an inlet flow associated with the turbine comprises: using a physics based model, using a non-physics based model, using an empirically tuned model, or using a model associated with determining an exhaust flow of the turbine.

7. The method of claim 6, wherein using a model associated with determining an exhaust flow of the turbine comprises:
based at least in part on the operational data from the turbine, determining the exhaust flow using one or more models associated with a second control volume around the turbine; and
based at least in part on the exhaust flow, determining the inlet flow associated with the turbine.

8. A system comprising:
a controller; and
a memory comprising computer-executable instructions operable to:
receive data associated with an inlet flow conditioning system associated with a turbine in a power plant;
based at least in part on operational data from the turbine, determine an inlet flow associated with the turbine;
based at least in part on the inlet flow associated with the turbine, determine an effective area of the inlet flow conditioning system;
based at least in part on a difference between the effective area of inlet flow conditioning system and a corresponding effective area of the inlet flow conditioning system determined at a prior operation, determine a fouling rate of the inlet flow conditioning system; and
based at least in part on the fouling rate and a performance target of the turbine, identify and perform a corrective recommendation for the inlet flow conditioning system, wherein the corrective recommendation comprises at least one of the following: replacing an inlet air filter assembly, cleaning an inlet air filter assembly, or initiating replacement or cleaning of an inlet air filter assembly.

9. The system of claim 8, wherein the computer-executable instructions are further operable to:
based at least in part on the effective area of the inlet flow conditioning system, determine an inlet flow conditioning system pressure drop at an operating condition of the turbine;
compare the inlet flow conditioning system pressure drop at the operating condition to a threshold inlet flow conditioning system pressure drop;
if the inlet flow conditioning system pressure drop at the operating condition exceeds the threshold inlet flow conditioning system pressure drop, generating an alert; and
based at least in part on the alert, identify a corrective recommendation for the inlet flow conditioning system.

10. The system of claim 8, wherein the computer-executable instructions to identify a corrective recommendation for the inlet flow conditioning system are further operable to:
use a model to evaluate revenue impact of the fouling rate, wherein the model incorporates dynamic parameters associated with the power plant.

11. The system of claim 8, wherein the computer-executable instructions operable to determine an inlet flow associated with the turbine are further operable to:
use one or more models associated with a control volume around the turbine excluding the inlet flow conditioning system.

12. The system of claim 8, wherein the data associated with the inlet flow conditioning system comprises: a pressure drop signal associated with the inlet flow conditioning system, a temperature signal, a pressure signal associated with the inlet flow conditioning system, or a relative humidity associated with the inlet flow conditioning system.

13. The system of claim 8, wherein the computer-executable instructions operable to determine an inlet flow associated with the turbine are further operable to: use a physics based model, use a non-physics based model, use an empirically tuned model, or use a model associated with determining an exhaust flow of the turbine.

14. The system of claim 13, wherein the computer-executable instructions operable to use a model associated with determining an exhaust flow of the turbine are further operable to:
based at least in part on the operational data from the turbine, determine the exhaust flow using one or more models associated with a second control volume around the turbine; and
based at least in part on the exhaust flow, determine the inlet flow associated with the turbine.

15. A system comprising:
a turbine associated with a power plant;
a controller; and
a memory comprising computer-executable instructions operable to:
receive data associated with an inlet flow conditioning system associated with the turbine;
based at least in part on operational data from the turbine, determine an inlet flow associated with the turbine;
based at least in part on the inlet flow associated with the turbine, determine an effective area of the inlet flow conditioning system;
based at least in part on a difference between the effective area of the inlet flow conditioning system and a corresponding effective area of the inlet flow conditioning system determined at a prior operation, determine a fouling rate of the inlet flow conditioning system; and
based at least in part on the fouling rate and a performance target of the turbine, identify and perform a corrective recommendation for the inlet flow conditioning system, wherein the corrective recommendation comprises at least one of the following: replacing an inlet air filter assembly, cleaning an inlet air filter assembly, or initiating replacement or cleaning of an inlet air filter assembly.

16. The system of claim 15, wherein the computer-executable instructions are further operable to:
based at least in part on the effective area of the inlet flow conditioning system, determine an inlet flow conditioning system pressure drop at an operating condition of the turbine;
compare the inlet flow conditioning system pressure drop at the operating condition to a threshold inlet flow conditioning system pressure drop;
if the inlet flow conditioning system pressure drop at the operating condition exceeds the threshold inlet flow conditioning system pressure drop, generating an alert; and
based at least in part on the alert, identify a corrective recommendation for the inlet flow conditioning system.

17. The system of claim 15, wherein the computer-executable instructions to identify a corrective recommendation for the inlet flow conditioning system are further operable to:

use a model to evaluate revenue impact of the fouling rate, wherein the model incorporates dynamic parameters associated with the power plant.

18. The system of claim 15, wherein the computer-executable instructions operable to determine an inlet flow associated with the turbine are further operable to:
use one or more models associated with a control volume around the turbine excluding the inlet flow conditioning system.

19. The system of claim 15, wherein the data associated with the inlet flow conditioning system comprises: a pressure drop signal associated with the inlet flow conditioning system, a temperature signal, a pressure signal associated with the inlet flow conditioning system, or a relative humidity associated with the inlet flow conditioning system.

20. The system of claim 15, wherein the computer-executable instructions operable to determine an inlet flow associated with the turbine are further operable to: use a physics based model, use a non-physics based model, use an empirically tuned model, or use a model associated with determining an exhaust flow of the turbine.

* * * * *